(12) United States Patent
Baru

(10) Patent No.: US 8,141,949 B2
(45) Date of Patent: Mar. 27, 2012

(54) COMPUTER DISPLAY VIEWING SUPPORT

(75) Inventor: Eran Baru, Tel Aviv (IL)

(73) Assignee: EMA Innovation, LLC, Tel Aviv (IL)

( * ) Notice: Subject to any disclaimer, the term of this patent is extended or adjusted under 35 U.S.C. 154(b) by 375 days.

(21) Appl. No.: 12/167,260

(22) Filed: Jul. 3, 2008

(65) Prior Publication Data
US 2010/0001563 A1    Jan. 7, 2010

(51) Int. Cl.
*A47C 7/62* (2006.01)
(52) U.S. Cl. .................. 297/217.3; 297/172; 297/174 R
(58) Field of Classification Search .................. 297/170, 297/172, 174 R, 188.01, 188.21, 217.3
See application file for complete search history.

(56) References Cited

U.S. PATENT DOCUMENTS

| | | | |
|---|---|---|---|
| 4,880,270 A | 11/1989 | Cooper | |
| 4,915,450 A | 4/1990 | Cooper | |
| 5,054,852 A | 10/1991 | Tholkes | |
| 5,961,179 A * | 10/1999 | Dixon et al. | 297/173 |
| 6,296,408 B1 * | 10/2001 | Larkin et al. | 400/682 |
| 6,315,358 B1 | 11/2001 | Baru | |
| D465,343 S * | 11/2002 | Daneault | D6/338 |
| 6,916,065 B2 * | 7/2005 | Park | 297/217.1 |
| 7,134,719 B2 * | 11/2006 | Moglin et al. | 297/217.3 |
| 7,823,973 B2 * | 11/2010 | Dragusin | 297/217.3 |
| 2001/0015567 A1 * | 8/2001 | Tholkes et al. | 297/172 |
| 2005/0127724 A1 * | 6/2005 | Irwin et al. | 297/188.01 |

* cited by examiner

*Primary Examiner* — Peter R. Brown
(74) *Attorney, Agent, or Firm* — Mark M. Friedman

(57) ABSTRACT

A computer display viewing support having a display positioning tray, including a vertical unit having a substantially vertical orientation adapted to vary a vertical location of the display tray between an uppermost position and a lowermost position, the vertical unit terminating in horizontal base and a tray pivoting unit supported by the vertical unit and adapted to pivot the display tray from a plurality of pivoting positions between a closed position to an open position.

5 Claims, 2 Drawing Sheets

COMPUTER DISPLAY VIEWING SUPPORT

FIELD AND BACKGROUND OF THE INVENTION

The present invention relates to computer work stations and, in particular, it concerns an inexpensive and comfortable computer display viewing support.

In recent years more and more people spend an increasing amount of time working with computers and viewing computer displays, either professionally or as Internet users. To meet the needs of this growing market, extensive thought has been given to devise convenient, space-saving supports or work-stations to make a user's position in front of the computer more comfortable and less tiresome. Such supports are disclosed, for instance, in U.S. Pat. No. 4,915,450, whose disclosure is incorporated herein by reference, and the references cited therein. These work supports, with integral chairs, were designed primarily for professional users in offices, rather than for domestic environments.

Baru, in U.S. Pat. No. 6,315,358 and PCT publication no WO99/04670, whose disclosure is incorporated herein by reference, discloses a computer work station including a user's seat and a monitor supporting tray positioned in front of the seat. The work station comprises a first chassis unit having a first base, an elongated seat supporting member, and first varying means for varying the location of the seat along the seat supporting member between a relatively reclining position and a relatively upright position. The work station further comprises a second chassis unit having a second base, an elongated monitor supporting member, and second varying means for varying the location of the monitor supporting tray between an uppermost position and a lowermost position. A coupling means is employed to couple the seat to the monitor supporting tray so that displacement of the seat toward the relatively reclining position results in the displacement of the monitor supporting tray toward the uppermost position, and displacement of the seat toward the relatively upright position results in the displacement of the monitor supporting tray toward the lowermost position. The disclosed mechanical coupling means between the seat and the monitor supporting tray involves cables and springs, offering a relatively inflexible, coupled mechanical adjustment of positions, in addition to a relatively large support footprint of the entire work station.

There is therefore a need to provide a modular and compact computer display viewing support that may be used with or without integral seating to allow maximum flexibility in viewing a computer display.

SUMMARY OF THE INVENTION

According to the teachings of the present invention there is provided, a computer display viewing support having a display positioning tray, including a vertical unit having a substantially vertical orientation adapted to vary a vertical location of the display tray between an uppermost position and a lowermost position, the vertical unit terminating in horizontal base; and a tray pivoting unit supported by the vertical unit and adapted to pivot the display tray from a plurality of pivoting positions between a closed position to an open position.

Preferably, the vertical unit comprises a pair of parallel, arcuate rails adapted to slidingly support the display tray and wherein a first positioning unit is adapted to vary the vertical location and the pivoting positions. Typically, the first positioning unit comprises at least one electrical motor and at least one mechanical linkage.

In an embodiment of the present invention, a computer display viewing support having a display supporting tray includes a vertical unit having a substantially vertical orientation and supporting legs, the vertical unit adapted to vary the location of the display tray between an uppermost position and a lowermost position, a tray pivoting unit supported by the vertical unit and adapted to pivot the display tray from a plurality of pivoting positions between a closed position to an open position, a second chassis unit having second chassis supporting legs and a plurality of elongated supporting members and adapted to attach to and stabilize the vertical support; and a data input tray supported by a member pivotably connected to the vertical unit, the member adapted to varyingly pivot between an uppermost and a lowermost orientation.

Preferably, the vertical unit comprises a pair of parallel, arcuate rails adapted to slidingly support the display tray and wherein a first positioning unit is adapted to vary and maintain the vertical location and pivoting positions. Most preferably, the member is pivoted by a second positioning unit. Typically, the plurality of elongated supporting members comprises a second pair of substantially parallel, arcuate rails and at least one stabilizing arcuate rail, the second pair of rails and the at least one stabilizing rail oriented and fixed to form an oval shape.

Typically, a viewer's seat having a back and at least one arm rest, slidingly supportable on the second pair of rails and facing the vertical support, is adapted to varyingly move between a closest position and a furthest position with respect to the vertical support and wherein the back is variably pivotable between a relatively reclining position and a relatively upright position. Most preferably, a third positioning unit is adapted to vary movements of the viewer's seat. Preferably, respective positioning units respectively comprise at least one motor and at least one mechanical linkage.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a Computer Display Viewing Support according to the present invention may be better understood with reference to the drawings and the accompanying description.

Figure 1:
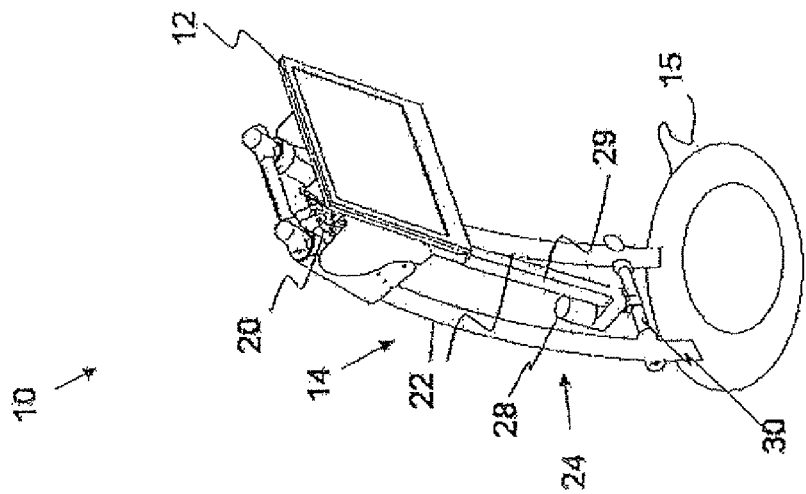
FIG. 1 is an illustration of a desktop computer display viewing support, in accordance with an embodiment of the present invention.

Referring now to the drawings, FIG. 1 is an illustration of a desktop computer display viewing support 10, in accordance with an embodiment of the present invention. A display positioning tray 12 is configured to slide along a vertical unit 14, between an uppermost and a lowermost position. Vertical unit 14 terminates in a horizontal base 15. A tray pivoting unit 20 (indicated behind the tray in the figure), which is supported by the vertical unit, serves to pivot the display tray from a closed position, as shown in the figure, to an open position approximately perpendicular to the vertical unit. Vertical unit 14 comprises a pair of parallel, arcuate rails 22, along which display tray 12 may slide. A first positioning unit 24, comprising one or more positioning motors 28 and one or more linkages 29, is pivotally mounted on a cross member 30 between arcuate rails 22. First positioning unit 24 serves to provide sliding and pivoting movement of display tray 12, described hereinabove.

Typically, a computer display (not shown in the figure) may be mounted onto the display tray for direct viewing, when the tray is in the closed position. Mounting hardware (not shown) as known in the art is typically located behind display tray for this purpose. When display tray is in the open positions the computer display may be placed upon the open display tray. The open position configuration is also useful for placing a laptop computer and working at a comfortable angle, while sitting or standing. Typically the horizontal base of the computer display viewing support is placed on a desk surface for comfortable and variable angle viewing the computer display although computer display viewing support 10 may also be placed on the floor. Computer viewing display support 10 may be used with a conventional chair to allow viewing the display while sitting. An alternate embodiment of computer display viewing support 10, having extended arcuate rails 22, may also be appropriate for floor placement. Rechargeable batteries or line voltage (both not show in the figure) may be used to power first positioning unit 24. Wire connections, if necessary from the computer display to a computer may be routed along arcuate rails, allowing the computer to be located in close proximity to the computer display viewing support.

Figure 2:
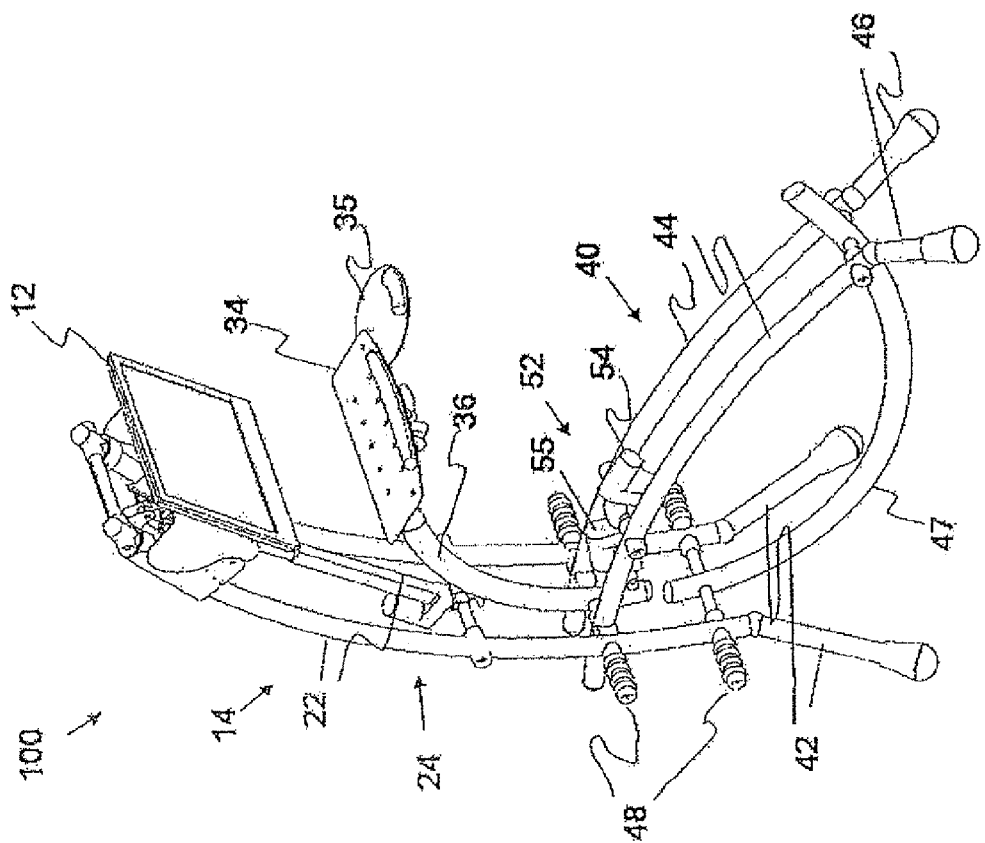
FIG. 2 is an illustration of a floor-supported computer display viewing support, having an data input tray, in accordance with an embodiment of the present invention.

Reference is now made to FIG. 2, whish is an illustration of a floor-supported computer display viewing support 100, having an data input tray 34, in accordance with an embodiment of the present invention Apart from differences described below, computer viewing display support 100 is generally similar to operation of computer display 10 as shown in FIG. 1, so that elements indicated by the same reference numerals are generally identical in configuration and operation. A pointing device tray 35, is attached to the edge of data input tray 34. The data input tray is supported by input tray support member 36, which is described further hereinbelow. Typically, pointing device tray 35 supports a keyboard (not shown in the figure) while a mouse or other pointing device (not shown in the figure) is placed on pointing device tray 35.

A second chassis unit 40 comprises pair of parallel, arcuate rails 44 which are fixed to arcuate rails 22 at a first end, and which terminate at legs 46 at a second end. Vertical unit 14 comprises extended arcuate rails 24, terminating in legs 42. At least one stabilizing arcuate rail 47 is attached to arcuate rails 44 at one end and to vertical unit 14 as shown, defining an approximate oval shape of the second chassis unit.

Input tray support member 36, is pivotably connected between the terminations of arcuate rails 44 where they are connected to the vertical support to allow varying height positions of input tray 34. Movement of the support member orientation is controlled by a second positioning unit 52. Second positioning unit 52, mounted between arcuate rails 44 as shown, comprises a motor 54 and a linkage 55 connecting it to member 36.

Bars 48, serve to connect the arcuate rails as described hereinabove. When a conventional chair is placed over second chassis unit 40 and the computer display is viewed in a sitting position, bars 48 also serve as foot rests. Alternatively, computer viewing display support 100 may be used while standing straddling second chassis unit 40.

Figure 3:
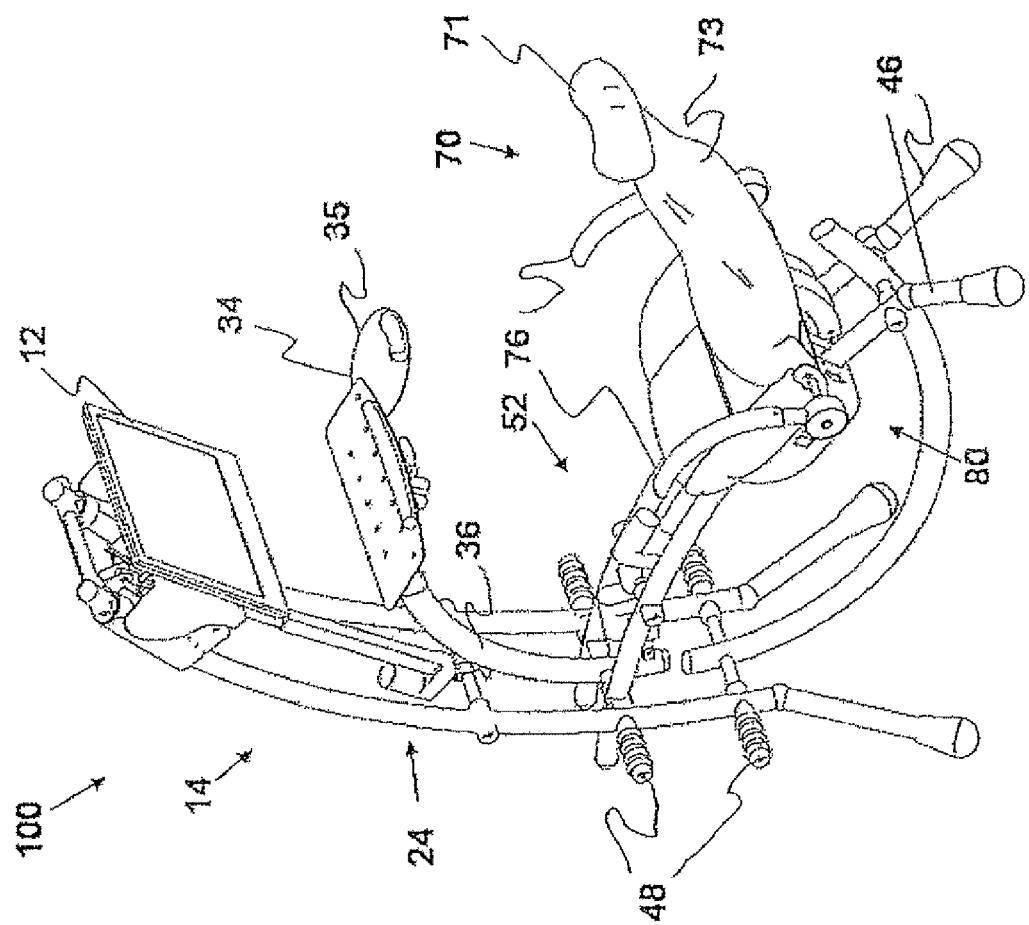
FIG. 3 is an illustration of a floor-supported computer display viewing support, having a data input tray and a viewer's seat, in accordance with an embodiment of the present invention.

Reference is now made to FIG. 3, which is an illustration of floor-supported computer display viewing support 100, having data input tray 34 and a viewer's seat 70, in accordance with an embodiment of the present invention. Apart from differences described below, computer viewing display support 100 is generally similar to operation of computer display 10 as shown in FIG. 1 and computer display viewing support 100 shown in FIG. 2, respectively, so that elements indicated by the same reference numerals are generally identical in configuration and operation. Viewer's seat 70 comprises a headrest 71, a seat back 73, and at least one hand rest 76. Viewer's seat 70 is positioned to slide on arcuate rails 44 towards and away from the vertical support. In addition, seat back 73 may be positioned to a more reclining or a more upright position. Movements of the viewer's seat 70, along arcuate rails 44, and of the seat back 73 are separately controlled by a third positioning unit 80, located under viewer's seat 70. Third positioning unit 80 comprises one or motors (not shown) and control switches 82 located on the lower left side of the seat. The various positions possible for movement of the seat long arcuate rails 44 and for pivoting seat back 73 allow more an optimally comfortable sitting position for a user.

Computer display viewing support 100 may be configured so that the first, second, and third positioning units may be controlled using control switches 82. As a result, a viewer seated in the seat may have full control over all movements and positioning of: display positioning tray 12; data input tray 34; and viewer's seat 71 (including seat back 73). Bars 48 may serve as convenient foot rests for the viewer when sitting in viewer's seat 71.

The tubular and modular construction of computer display viewing supports 10 and 100 affords relatively inexpensive manufacturing and packaging of the supports, allowing the supports to easily transported and constructed by most consumers.

It will be appreciated that the above descriptions are intended only to serve as examples, and that many other embodiments are possible within the scope of the present invention as defined in the appended claims.

What is claimed is:

1. A computer display viewing support having a display supporting tray, comprising:
    (a) a vertical unit having a substantially vertical orientation and supporting legs, the vertical unit including an actuator configured to vary the location of the display tray between an uppermost position and a lowermost position;
    (b) a tray pivoting unit supported by the vertical unit and adapted to pivot the display tray from a plurality of pivoting positions including a first position and a second position;
    (c) a chassis unit having chassis supporting legs and a plurality of elongated supporting members and adapted to attach to and stabilize the vertical support; and
    (d) a data input tray supported by a tray member pivotably connected to the vertical unit, the member adapted to varyingly pivot between an uppermost and a lowermost orientation, wherein the plurality of elongated supporting members comprises a second pair of substantially parallel, arcuate rails and at least one stabilizing arcuate rail, the second pair of rails and the at least one stabilizing rail oriented and fixed to form an oval shape.

2. The computer display viewing support of claim 1, wherein a viewer's seat, having a back and at least one arm rest, slidingly supportable on the second pair of rails and facing the vertical support, is adapted to varyingly move between a closest position and a furthest position with respect to the vertical support and wherein the back is variably pivotable between a relatively reclining position and a relatively upright position.

3. The computer display viewing support of claim 2, wherein a third positioning unit is adapted to vary movements of the viewer's seat.

4. The computer display viewing support of claim 3, wherein the first, second and third positioning units respectively comprise at least one motor and at least one mechanical linkage.

5. The computer display support of claim 1, wherein in the second position the display tray is oriented approximately perpendicular to the vertical unit.

* * * * *

UNITED STATES PATENT AND TRADEMARK OFFICE
CERTIFICATE OF CORRECTION

Page 1 of 1

PATENT NO. : 8,141,949 B2
APPLICATION NO. : 12/167260
DATED : March 27, 2012
INVENTOR(S) : Eran Baru It is certified that error appears in the above-identified patent and that said Letters Patent is hereby corrected as shown below:

Title Page

Related Application Data

(60) should be corrected as follows:

Add: "Continuation of PCT/IL2006/000011 filed on January 3, 2006"

Signed and Sealed this
Twenty-ninth Day of April, 2014

Michelle K. Lee
*Deputy Director of the United States Patent and Trademark Office*